UNITED STATES PATENT OFFICE.

TOUSSAINT JOSEPH WIBRIN AND RENÉ WIBRIN, OF CHAUDEFONTAINE, BELGIUM.

ALUMINUM-SOLDER.

No. 900,810.   Specification of Letters Patent.   Patented Oct. 13, 1908.

Application filed April 22, 1908. Serial No. 428,627.

*To all whom it may concern:*

Be it known that we, TOUSSAINT J. WIBRIN and RENÉ WIBRIN, subjects of the King of Belgium, residing at Chaudefontaine, Province of Liege, Belgium, have invented certain new and useful Improvements in Aluminum-Solder, of which the following is a specification.

The present invention relates to an alloy for soldering aluminium which will give an exceedingly strong joint between the parts to be soldered, and which besides being employed for soldering together two parts of aluminium, may also be employed for soldering to aluminium, metals of different nature, such as iron, copper and the like.

The improved solder consists of an alloy of tin, zinc and copper in the following proportions:—

| | |
|---|---|
| Tin | 1000 grams. |
| Zinc | 750 grams. |
| Copper | 100 grams. |

To prepare the solder the copper and zinc are melted together and then the tin, which predominates, is added. This alloy can be run into sticks similar to ordinary sticks of solder and employed as such.

An alloy is obtained in which the melting of the copper is facilitated by the presence of the tin and of which the point of fusion is sufficiently near to that of the aluminium to obtain a good joint between two pieces of aluminium or between a piece of aluminium and another metal, such, for example, as iron or copper. Moreover, the solder is malleable and can flow freely when in use.

The pieces to be soldered, previously carefully cleaned, are first heated by means and then the stick of solder is placed on the parts thus prepared, and the operations effected as in the case of ordinary solder.

Having fully described our invention, what we desire to claim and secure by Letters Patent is:—

Solder for aluminium, also permitting of soldering to aluminium metals of different natures, characterized by an alloy having the proportions of 1000 grams of tin, 750 grams of zinc, and 100 grams of copper.

In testimony whereof we affix our signatures in presence of two witnesses.

TOUSSAINT JOSEPH WIBRIN
RENÉ WIBRIN.

Witnesses:
  VICTOR HAMAL,
  VICTOR HAUBE.